US012617370B2

(12) United States Patent
Strauss et al.

(10) Patent No.: US 12,617,370 B2
(45) Date of Patent: May 5, 2026

(54) SELF-LOCKING BELT RETRACTOR

(71) Applicant: Autoliv Development AB, Vargarda (SE)

(72) Inventors: Julian Strauss, Elmshorn (DE); Markus Hueg, Hamburg (DE); Arne Bargmann, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 170 days.

(21) Appl. No.: 18/579,992

(22) PCT Filed: Jul. 11, 2022

(86) PCT No.: PCT/EP2022/069263
§ 371 (c)(1),
(2) Date: Jan. 17, 2024

(87) PCT Pub. No.: WO2023/001614
PCT Pub. Date: Jan. 26, 2023

(65) Prior Publication Data
US 2024/0359654 A1      Oct. 31, 2024

(30) Foreign Application Priority Data

Jul. 22, 2021    (DE) ..................... 10 2021 119 062.2

(51) Int. Cl.
B60R 22/38        (2006.01)
B60R 22/34        (2006.01)
(52) U.S. Cl.
CPC ...... B60R 22/38 (2013.01); *B60R 2022/3419* (2013.01)

(58) Field of Classification Search
CPC ........... B60R 22/38; B60R 2022/3402; B60R 2022/3419
See application file for complete search history.

(56) References Cited

U.S. PATENT DOCUMENTS

| | | | |
|---|---|---|---|
| 8,118,249 B2 * | 2/2012 | Aihara | .................... B60R 22/41 242/383.1 |
| 8,777,269 B2 * | 7/2014 | Bosse | ................... B60R 22/341 242/382.5 |
| 9,738,249 B2 * | 8/2017 | Heine | ..................... B60R 22/38 |
| 2012/0175451 A1 | 7/2012 | Yanagawa et al. | |

FOREIGN PATENT DOCUMENTS

| | | |
|---|---|---|
| DE | 10324195 A1 | 1/2005 |
| DE | 10 2010 046 980 A1 | 4/2012 |
| DE | 102013216491 A1 | 2/2015 |
| WO | 2008064870 A1 | 6/2008 |

* cited by examiner

*Primary Examiner* — Sang K Kim
(74) *Attorney, Agent, or Firm* — Dickinson Wright, PLLC

(57)        ABSTRACT

A self-locking belt retractor comprising a belt shaft which is rotatably mounted in a frame, wherein a safety belt can be wound up said belt shaft, a blocking device which blocks the belt shaft if a predetermined feed-out acceleration of the safety belt in the feed-out direction of the safety belt is exceeded, and comprising a control disc device mounted on the belt shaft, the control disc device comprising a control disc and an inert mass which is mounted on the control disc so as to be pivotable about a pivot axis.

10 Claims, 6 Drawing Sheets

SELF-LOCKING BELT RETRACTOR

Figures 1A, 1B:
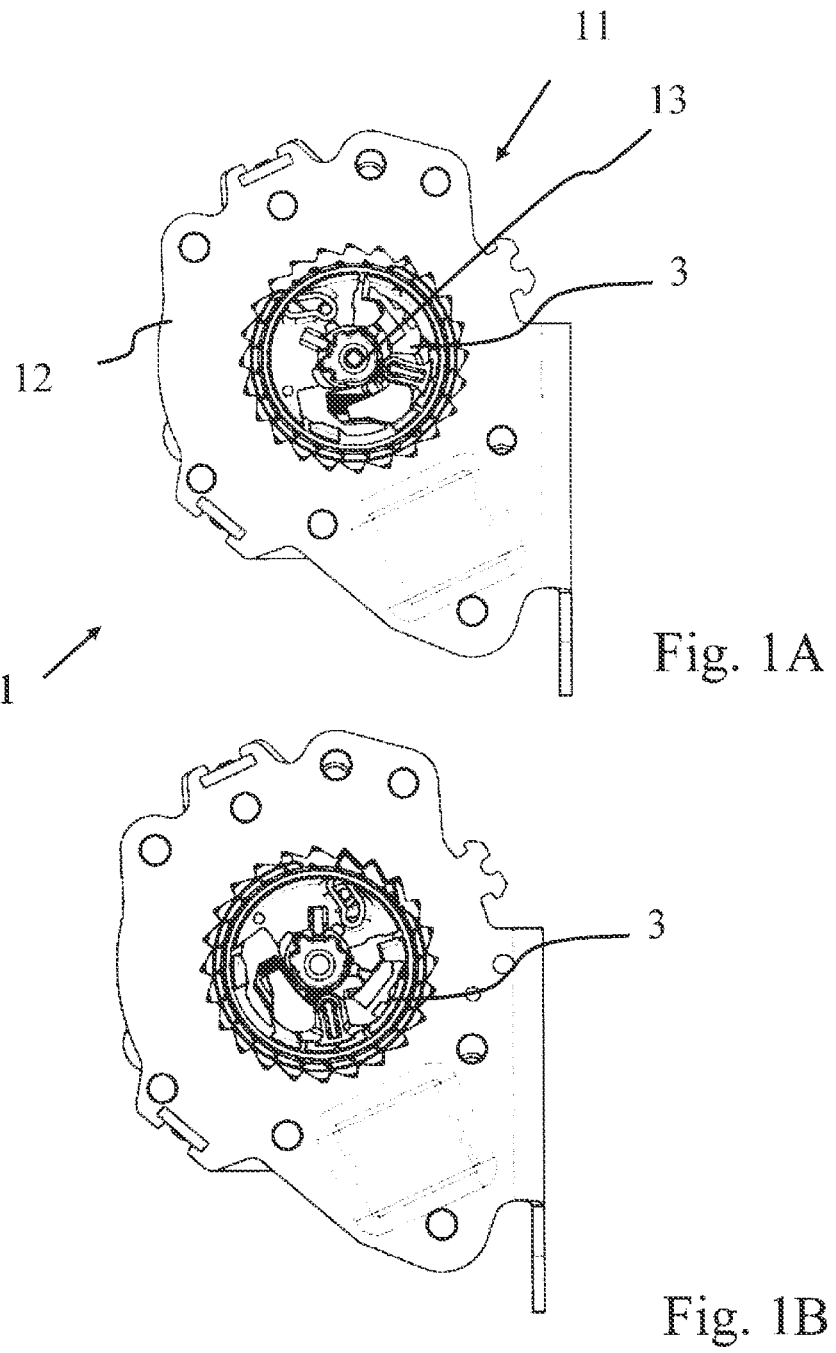

The present invention relates to a self-locking belt retractor having a belt shaft which is rotatably mounted in a frame and on which a safety belt can be wound, a blocking apparatus which blocks the belt shaft when a predetermined pull-out acceleration of the safety belt is exceeded in the pull-out direction of the safety belt, and with a control disc device which is mounted on the belt shaft and which is particularly spring-biased in the direction of extension of the safety belt, wherein the control disc device comprises a control disk and an inertia mass which is mounted on the control disk so as to pivot about a pivot axis. The (virtual) pivot axis of the inertia mass is particularly aligned parallel to an axis of rotation of the belt shaft.

Self-locking belt retractors are generally used in vehicle safety belt systems to retract an unfastened safety belt into a parking position and to allow variable extension of the safety belt with as little slack as possible. For this purpose, the belt retractor has a belt shaft that is rotatably mounted in a frame and spring-loaded in the winding direction, on which the safety belt can be wound. Further, the belt retractor has a blocking apparatus which is activated when a predetermined pull-out acceleration of the safety belt is exceeded, so that the belt shaft is subsequently blocked in the belt pull-out direction. The blocking apparatus comprises a blocking pawl mounted on the belt shaft, the movement of which is controlled by the control disc device mounted rotatably on the belt shaft. The control disc of the control disc device is spring-loaded in the belt pull-out direction of the belt shaft and rotates with the belt shaft below the predetermined pull-out acceleration of the safety belt. An inertia mass is pivotably mounted on the control disk, which pivots when the predetermined pull-out acceleration of the safety belt is exceeded and thereby engages in a frame-mounted toothing of the belt retractor and stops the control disk relative to the belt shaft. Stopping the control disc in turn activates the blocking apparatus, in that the blocking pawl mounted on the belt shaft executes a control movement forced by a guide in a control contour in the control disc into a toothing fixed to the frame.

Due to the object described above, the inertia mass must have a certain mass, otherwise it will not pivot when the pull-out acceleration is exceeded. Further, the inertia mass must be pivotably mounted on the control disc, which rotates with the belt shaft, in such a manner that it can perform a relative movement with respect to the control disc for controlling the blocking apparatus. Due to the mass of the inertia mass and its bearing movement, vibrations impacting on the belt retractor can lead to unwanted noise being generated by the inertia mass.

A self-locking belt retractor with the above features is known, for example, from DE 10 2010 046 980 A1. In the belt retractor described there, unwanted noise is prevented by a protrusion that limits the relative movement between the inertia mass and the control disc.

The object of the present invention is to provide an alternative solution for avoiding unwanted noise.

The object is solved by a self-locking belt retractor with the features of the independent claim. Advantageous further embodiments of the belt retractor are given in the dependent claims and in the preceding and following description, wherein individual features of the advantageous further embodiments can be combined with one another in a technically expedient manner.

The object is solved in particular by a self-locking belt retractor with the features mentioned at the beginning, wherein a pretensioning apparatus is provided which pretensions the inertial mass parallel to the pivot axis in the direction of the control disc. Such a pretensioning apparatus could, for example, be realized by a spring that acts on the inertia mass parallel to the pivot axis. However, other deflectable/deformable elements can also be provided as pretensioning apparatus, which preload the inertia mass parallel to the pivot axis, but still allow a (small) relative movement between the inertia mass and the control disc parallel to the pivot axis.

Such a preload parallel to the pivot axis of the inertia mass can prevent a movement of the inertia mass transverse to the plane of the pivoting movement of the inertia mass that causes rattling noises. Particularly if the force provided by the pretensioning apparatus acts directly on the pivot axis, the pivoting movement performed by the inertial mass is hardly or not at all influenced by the pretensioning apparatus. The pretensioning apparatus thus exerts a force parallel to the pivot axis on the inertia mass, as a result of which the inertia mass could move minimally parallel to the pivot axis under large forces, but does not perform any movements in normal operation. In this manner, the pretensioning apparatus compensates for the minimal clearance at the axial ends of the elements forming the pivot axis between the inertia mass and the other components that would otherwise be required due to tolerances.

In principle, it is possible for the pretensioning apparatus to be designed on a component of the self-locking belt retractor. For example, the pretensioning apparatus could be designed as part of a cap covering the control disc device, so that the pretensioning apparatus only acts on the inertia mass after the belt retractor has been fully mounted. The pretensioning apparatus could also be designed as part of the control disc.

However, it is preferable that the pretensioning apparatus can be fixed or secured to the control disc as a separate component. This makes it possible to mount the pretensioning apparatus to the control disc only after the inertia mass has been attached to the control disc, so that the control disc device can be attached to the other components of the self-locking belt retractor as an independent assembly during mounting.

The preferably one-piece pretensioning apparatus is preferably fixed to the control disc by force and/or form closure, in particular directly (i.e. without further components), which simplifies mounting. For example, a snap connection can be designed between the pretensioning apparatus and the control disc.

Particularly in this context, it may be provided that the pretensioning apparatus has a deflectable spring arm that extends parallel to the control disc. A deflection of the particularly free end of the spring arm is thus approximately parallel to the pivot axis of the control disc, while the spring arm extends orthogonally to the pivot axis.

Preferably, exactly one component comprising the deflectable spring arm is provided, which forms the pretensioning apparatus.

As a rule, the pivot axis is defined by a protrusion designed on the inertia mass and particularly circular in cross-section. In this case, it is proposed that a corresponding receptacle for the protrusion of the inertia mass is provided on the pretensioning apparatus, wherein in the case of the formation of a spring arm, the receptacle is preferably arranged at a (free) end of the spring arm. In the assembled state, the protrusion designed on the inertia mass then engages in the receptacle on the spring arm, wherein the protrusion and the receptacle have a corresponding cross-sectional design (particularly circular).

In an alternative embodiment, however, it may also be provided that the spring arm has a protrusion which engages in a corresponding receptacle in the inertia mass to form the pivot axis of the inertia mass.

In order to prevent the protrusion from unintentionally coming out of the receptacle, particularly when a receptacle is formed at the end of the deflectable end of the spring arm, it is proposed that the deflectable end of the spring arm is surrounded at least in portions by a locking web. The at least one locking web can be designed on another component of the belt retractor. Preferably, however, the locking web is designed in one piece with the spring arm and thus as a component of the one-piece pretensioning apparatus. The locking web is arranged around the free end of the spring arm in the circumferential direction (with reference to the pivot axis of the inertia mass). If the protrusion on the inertia mass were to protrude from the receptacle at the end of the spring arm, the protrusion would be forced back into the receptacle by at least one locking web. The locking web is particularly designed in such a manner that it surrounds the free end of the spring arm in the circumferential direction for at least 180° and preferably at least 250°.

In order to prevent the protrusion of the inertia mass along the spring arm from protruding out of the receptacle at the end of the spring arm, it is proposed that the spring arm has a stop projecting in the direction of the control disc at a distance from its deflectable end. This stop is arranged adjacent to the receptacle at the end of the spring arm in such a manner that the protrusion cannot get out of the receptacle.

An independent invention for solving the object mentioned at the beginning is also seen, independently of the solution described above, in that at least one tapering protrusion is provided to form the pivot axis. It is therefore proposed that a protrusion defining the pivot axis, which is arranged particularly either on the inertia mass itself or on another component of the belt retractor (such as approximately on the spring arm, the control disc or the cover cap), tapers towards its end, i.e. its cross-section becomes smaller towards the end. Such a protrusion, which defines the pivot axis, usually has a circular cross-sectional design. The tapered design of the protrusion provides a more point-shaped bearing point (in contrast to a flat bearing), which reduces friction during the pivoting movement of the inertia mass, particularly in combination with a preload.

In this context, it is particularly envisaged that exactly two tapering protrusions are arranged on opposite sides of the inertia mass. In one embodiment, the tapering protrusions are designed in one piece with the inertia mass and arranged in corresponding receptacles (in the control disc, on the spring arm or on the cap). In an alternative embodiment, however, the protrusions can also be designed on the control disc and on the spring arm or on the cap.

To ensure that the receptacle has a predefined bearing point, it is proposed that a receptacle or each receptacle for a tapering protrusion is designed as a cone-shaped trough. Such a cone-shaped trough also ensures that if force is applied to the protrusions orthogonal to the pivot axis during operation, they return to the predefined bearing point. The opening angle of the cone-shaped trough is preferably slightly larger (particularly more than 1° and less than) 5° than the angle of the tip of the protrusion.

Figure 2:
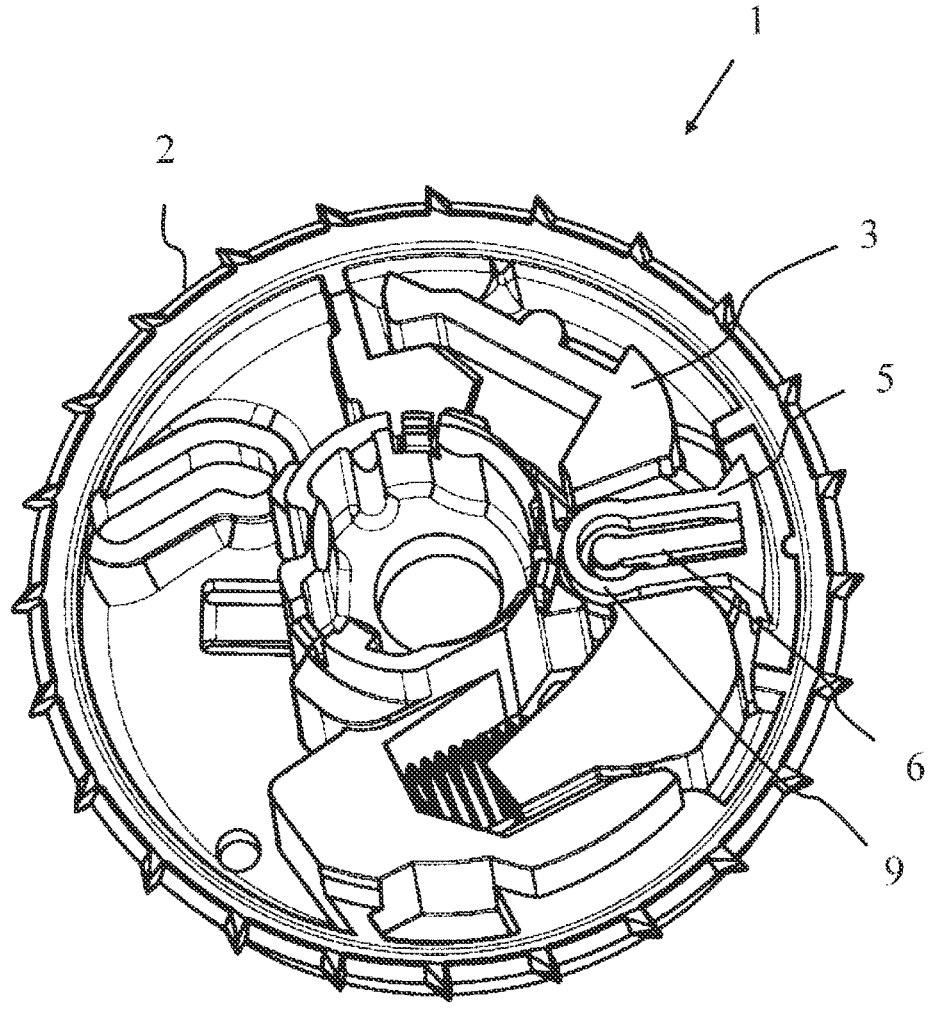
Figure 3:
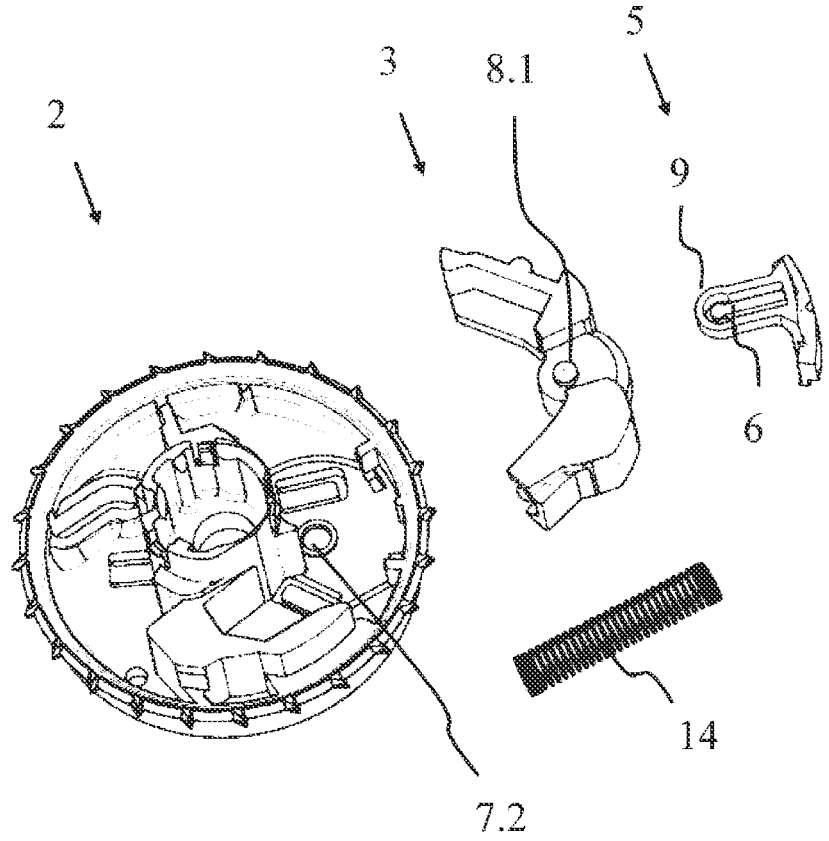
Figure 4:
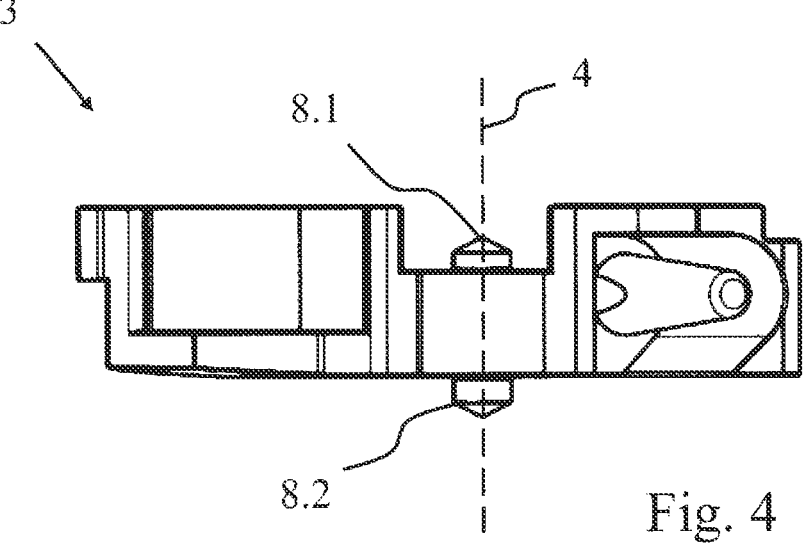
Figure 5:
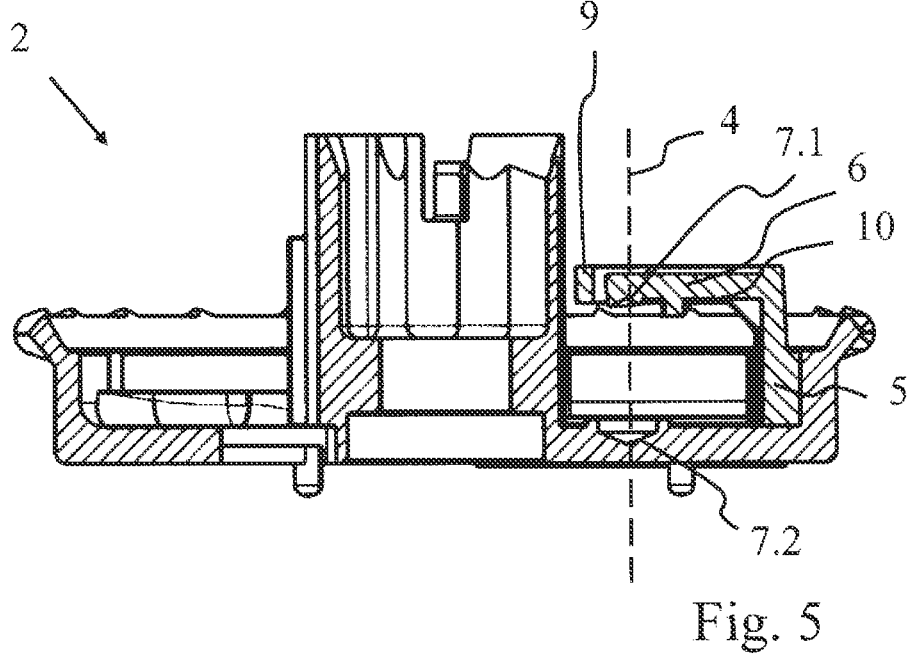
Figure 6:
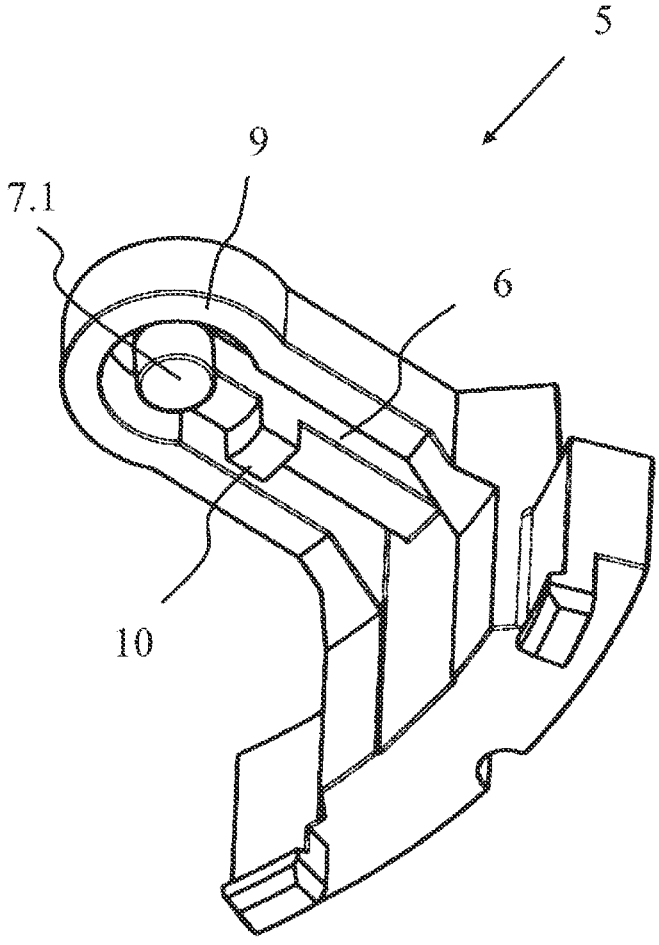
Figure 7:
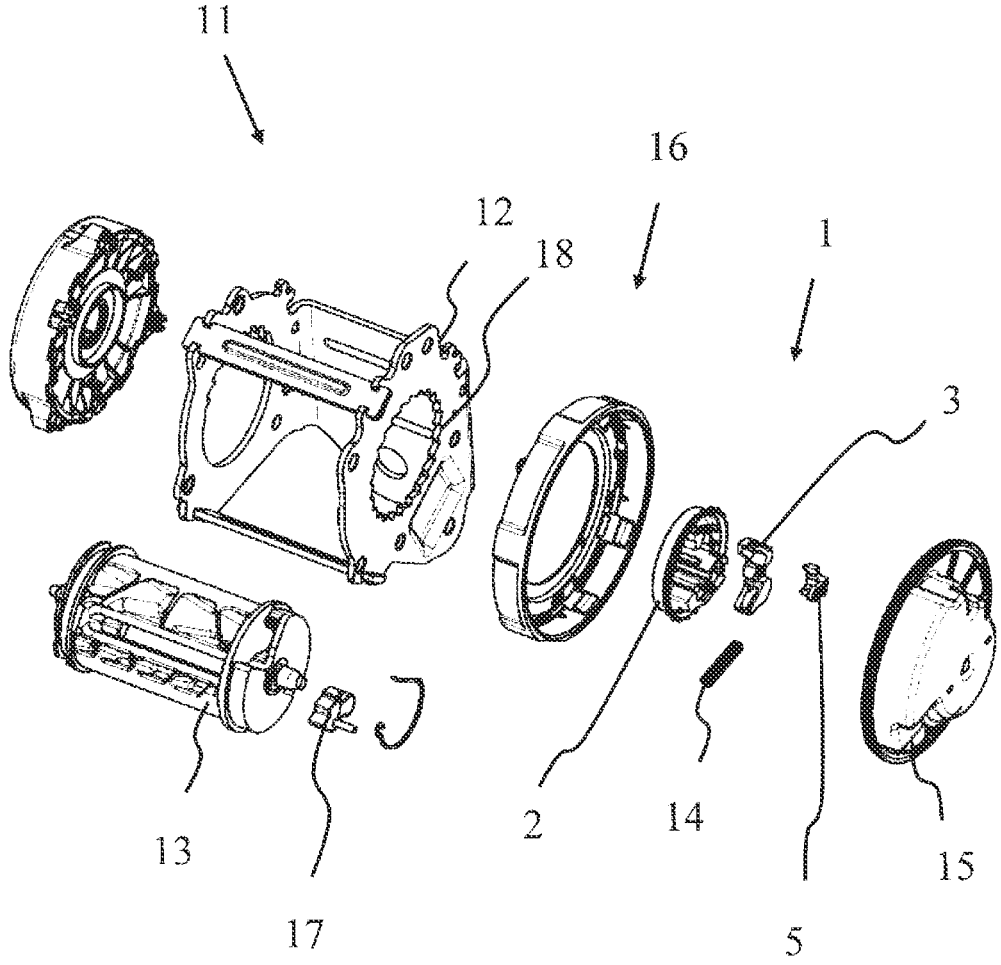

The invention and the technical environment are explained below by way of example with reference to the figures. The following are shown schematically:

FIG. 1a: shows a side view of a self-locking belt retractor with an inertia mass that is not swung out, FIG. 1b: shows the belt retractor of FIG. 1a with the inertia mass swung out, FIG. 2: shows a control disc device of the belt retractor of FIG. 1, FIG. 3: shows an exploded view of the control disc device, FIG. 4: shows a side view of an inertial mass of the control disc device of FIG. 2, FIG. 5: shows a cross-sectional view through the control disc device of FIG. 2 without the inertia mass, FIG. 6: shows a perspective view of a pretensioning apparatus of the control disc device of FIG. 2 and FIG. 7: shows an exploded view of the self-locking belt retractor of FIG. 1.

The self-locking belt retractor shown in FIGS. 1a, 1b and 7 comprises a frame 12 in which a belt shaft 13 for winding up a safety belt not shown is rotatably mounted.

The self-locking belt retractor 11 also comprises a blocking apparatus 16, which can be used to block the safety belt from being pulled out from the belt shaft 13. For this purpose, the blocking apparatus 16 has a blocking pawl 17, which can be activated to block the rotary movement of the belt shaft 13 and, in the activated state, engages in an external toothing 18 on the frame 12 of the belt retractor 11.

To actuate the blocking pawl 17, the belt retractor 11 has a control disc device 1 comprising a control disc 2, an inertia mass 3, a spring 14 and a pretensioning apparatus 5, wherein the inertia mass 3 is pivotably layered on the control disc 2 and is acted upon by the spring 4 with a spring force.

In the assembled state, the control disc device 1 is covered by a cap 15 not shown in FIGS. 1a and 1b (see FIG. 7).

During the extension of the safety belt, the control disc device 1 initially rotates with the belt shaft 13. In this state, the inertia mass 3 has not yet swung out, as represented in FIG. 1a. As soon as a predetermined pull-out acceleration is exceeded during pull-out, the inertia mass 3 shown in FIGS. 1a and 1b swings out about a pivot axis 4 (see FIG. 1b). The inertia mass 3 engages with a toothing, which stops the control disc 2 relative to the belt shaft 13. During the subsequent relative movement of the belt shaft 13 with respect to the stopped control disc 2, the blocking pawl 16 is actuated by a guide in a control contour in the control disc 2, causing the blocking pawl 16 to engage with the external toothing 18 on the frame 12. This also blocks the rotary movement of the belt shaft 13 relative to the frame 12.

The function of a self-locking belt retractor described above is known per se from the prior art.

Firstly, it is now proposed that the control disc device 1 comprises a pretensioning apparatus 5. The one-piece pretensioning apparatus 5 is designed in such a manner that it can be fixed to the control disc 3 in a force-fit and form-fit manner by means of a snap connection (see particularly FIG. 5).

As can be seen particularly from the detailed view in FIG. 6, the pretensioning apparatus 5 comprises a deflectable spring arm 6, which has a receptacle 7.1 at its deflectable end. The deflectable end of the spring arm 6 is surrounded by a locking web 9. In addition, the spring arm 6 has a stop 10 projecting (downwards in FIG. 5) towards the control disc 2.

In the assembled state of the belt retractor 11, a protrusion 8.1 of the inertia mass 3, which determines the pivot axis 4, is arranged in the receptacle 7.1 of the spring arm 6.

The pretensioning apparatus 5 is dimensioned in such a manner that the spring arm 6 pretensions the inertia mass 3 via the protrusion 7.1 parallel to the pivot axis 4 in the direction of the control disc 2, such that any play that would otherwise be present is compensated for and the inertia mass 3 cannot perform any relative movement in the direction of the pivot axis 4 to the control disc 2 that generates rattling noises.

The locking web 9 and the stop 10 are arranged and designed in such a manner that the protrusion 8.1 of the inertia mass 3 is prevented from unintentionally coming out of the receptacle 7.1.

On the other hand, it is proposed that the inertia mass 3 has protrusions 8.1 and 8.2 on opposite sides to form the pivot axis 4, which are pointed (see FIG. 4).

In the assembled state, the protrusion 8.1 is arranged in the receptacle 7.1 designed on the spring arm 6 of the pretensioning apparatus 5, while the protrusion 8.2 is arranged in a receptacle 7.2 designed in the control disc (see FIGS. 3 and 5). The receptacles 7.1 and 7.2 are designed as cone-shaped recesses, such that the tapering protrusions 8.1 and 8.2 and the receptacles 7.1 and 7.2 each have only point-shaped contact between them.

LIST OF REFERENCE SIGNS

1 control disc device
2 control disk
3 inertia mass
4 pivot axis
5 pretensioning apparatus
6 spring arm
7.1 receptacle
7.2 receptacle
8.1 protrusion
8.2 protrusion
9 locking web
10 stop
11 bolt retractor
12 frame
13 belt shaft
14 spring
15 cap
16 blocking apparatus
17 blocking pawl
18 external toothing
The invention claimed is:
1. A self-locking belt retractor having
a frame,
a belt shaft rotatably mounted in the frame, on which a safety belt can be wound,
a blocking apparatus which blocks the belt shaft when a predetermined pull-out acceleration of the safety belt is exceeded in the pull-out direction of the safety belt, and
a control disc device mounted on the belt shaft, wherein the control disc device comprises
a control disc and
an inertia mass which is pivotably mounted on the control disc about a pivot axis,
wherein
a pretensioning apparatus superimposes and pretensions the inertia mass parallel to the pivot axis in the direction of the control disc.
2. The belt retractor according to claim 1, wherein the pretensioning apparatus is fixed to the control disc as a separate component.
3. The belt retractor according to claim 1, wherein the pretensioning apparatus has a deflectable spring arm which extends parallel to the control disc.

4. The belt retractor according to claim 1, wherein at least one tapering protrusion is provided to form the pivot axis.
5. The belt retractor according to claim 4, wherein a receptacle for a tapering protrusion is designed as a cone-shaped trough.
6. A self-locking belt retractor having
a frame,
a belt shaft rotatably mounted in the frame, on which a safety belt can be wound,
a blocking apparatus which blocks the belt shaft when a predetermined pull-out acceleration of the safety belt is exceeded in the pull-out direction of the safety belt, and
a control disc device mounted on the belt shaft, wherein the control disc device comprises
a control disc and
an inertia mass which is pivotably mounted on the control disc about a pivot axis,
wherein
a pretensioning apparatus is provided, which pretensions the inertia mass parallel to the pivot axis in the direction of the control disc;
the pretensioning apparatus has a deflectable spring arm which extends parallel to the control disc; and
the spring arm has a receptacle for a protrusion designed on the inertia mass to form the pivot axis.
7. A self-locking belt retractor having
a frame,
a belt shaft rotatably mounted in the frame, on which a safety belt can be wound,
a blocking apparatus which blocks the belt shaft when a predetermined pull-out acceleration of the safety belt is exceeded in the pull-out direction of the safety belt, and
a control disc device mounted on the belt shaft, wherein the control disc device comprises
a control disc and
an inertia mass which is pivotably mounted on the control disc about a pivot axis,
wherein
a pretensioning apparatus is provided, which pretensions the inertia mass parallel to the pivot axis in the direction of the control disc;
the pretensioning apparatus has a deflectable spring arm which extends parallel to the control disc; and
the spring arm has a protrusion which engages in a receptacle in the inertia mass to form the pivot axis.
8. A self-locking belt retractor having
a frame,
a belt shaft rotatably mounted in the frame, on which a safety belt can be wound,
a blocking apparatus which blocks the belt shaft when a predetermined pull-out acceleration of the safety belt is exceeded in the pull-out direction of the safety belt, and
a control disc device mounted on the belt shaft, wherein the control disc device comprises
a control disc and
an inertia mass which is pivotably mounted on the control disc about a pivot axis,
wherein
a pretensioning apparatus is provided, which pretensions the inertia mass parallel to the pivot axis in the direction of the control disc;
the pretensioning apparatus has a deflectable spring arm which extends parallel to the control disc; and
a deflectable end of the spring arm is surrounded at least in portions by a locking web.
9. A self-locking belt retractor having
a frame, a belt shaft rotatably mounted in the frame, on which a safety belt can be wound, a blocking apparatus which blocks the belt shaft when a predetermined pull-out acceleration of the safety belt is exceeded in the pull-out direction of the safety belt, and a control disc device mounted on the belt shaft, wherein the control disc device comprises a control disc and an inertia mass which is pivotably mounted on the control disc about a pivot axis, wherein a pretensioning apparatus is provided, which pretensions the inertia mass parallel to the pivot axis in the direction of the control disc;

the pretensioning apparatus has a deflectable spring arm which extends parallel to the control disc; and the spring arm has a stop projecting in the direction of the control disc at a distance from its deflectable end.

10. A self-locking belt retractor having a frame, a belt shaft rotatably mounted in the frame, on which a safety belt can be wound, a blocking apparatus which blocks the belt shaft when a predetermined pull-out acceleration of the safety belt is exceeded in the pull-out direction of the safety belt, and a control disc device mounted on the belt shaft, wherein the control disc device comprises a control disc and an inertia mass which is pivotably mounted on the control disc about a pivot axis, wherein a pretensioning apparatus is provided, which pretensions the inertia mass parallel to the pivot axis in the direction of the control disc;

at least one tapering protrusion is provided to form the pivot axis; and exactly two tapering protrusions are arranged on opposite sides of the inertia mass.

* * * * *